United States Patent [19]

Fukushima

[11] Patent Number: 5,868,232
[45] Date of Patent: *Feb. 9, 1999

[54] CLUTCH APPARATUS HAVING A VIBRATION DAMPENSING MECHANISM, A REDUCED AXIAL THICKNESS AND AN UNDULATED SPRING DISPOSED WITHIN THE VIBRATION DAMPENING MECHANISM

[75] Inventor: Hirotaka Fukushima, Hirakata, Japan

[73] Assignee: Exedy Corporation, Osaka, Japan

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,551,318.

[21] Appl. No.: 699,072

[22] Filed: Aug. 14, 1996

[30] Foreign Application Priority Data

| Aug. 24, 1995 | [JP] | Japan | 7-215899 |
| Aug. 24, 1995 | [JP] | Japan | 7-215900 |
| Aug. 24, 1995 | [JP] | Japan | 7-215901 |

[51] Int. Cl.$^6$ .............................. F16D 13/44; F16D 13/58
[52] U.S. Cl. ..................................... 192/70.13; 192/70.17; 192/70.18; 192/89.23; 192/208
[58] Field of Search ............................... 192/70.17, 70.18, 192/55.4, 208, 89.23, 212, 70.13; 74/574; 464/24

[56] References Cited

U.S. PATENT DOCUMENTS

| 1,907,915 | 5/1933 | Wemp | 192/70.17 |
| 4,241,820 | 12/1980 | Ban et al. | 192/89.23 |
| 4,493,409 | 1/1985 | Steeg . | |
| 4,660,700 | 4/1987 | Maucher et al. | 192/89.23 |
| 4,811,826 | 3/1989 | Kittel et al. . | |
| 4,949,829 | 8/1990 | Tojima et al. | 192/89.23 |
| 5,388,474 | 2/1995 | Tanaka et al. . | |
| 5,392,888 | 2/1995 | Kajitani et al. | 192/70.13 X |
| 5,551,318 | 9/1996 | Fukushima | 192/70.17 X |
| 5,562,541 | 10/1996 | Fukushima . | |
| 5,617,940 | 4/1997 | Fukushima et al. | 192/70.17 |
| 5,622,245 | 4/1997 | Reik et al. | 192/70.18 X |
| 5,645,151 | 7/1997 | Lindner et al. | 192/70.17 |
| 5,680,918 | 10/1997 | Reik et al. | 192/55.1 |
| 5,715,919 | 2/1998 | Viola et al. | 192/70.18 |

FOREIGN PATENT DOCUMENTS

| 2 119 039 | 11/1983 | United Kingdom . |
| 2 144 810 | 3/1985 | United Kingdom . |
| 2 150 652 | 7/1985 | United Kingdom . |

*Primary Examiner*—Rodney H. Bonck
*Attorney, Agent, or Firm*—Shinjyu An Intellectual Property Firm

[57] ABSTRACT

In a clutch apparatus, a clutch cover assembly can be reused after replacement of a clutch disk assembly. The clutch apparatus includes an input flywheel and a clutch cover assembly. The input flywheel is provided at its outer peripheral surface with a plurality of engagement portions which are circumferentially spaced from each other and project radially outwardly. The clutch cover assembly has a clutch cover, a fixing member, a pressure plate and a biasing member. The clutch cover is provided at its outer periphery with a bent engagement portion which is circumferentially engageable with the engagement portion of the flywheel for preventing axial movement relative to the flywheel. The fixing member is removable, and fixes the flywheel and the clutch cover for integral rotation. The pressure plate is disposed between the clutch cover and the flywheel. The biasing member is supported by the inner peripheral portion of the clutch cover, and biases the pressure plate toward the flywheel.

35 Claims, 9 Drawing Sheets

CLUTCH APPARATUS HAVING A VIBRATION DAMPENSING MECHANISM, A REDUCED AXIAL THICKNESS AND AN UNDULATED SPRING DISPOSED WITHIN THE VIBRATION DAMPENING MECHANISM

BACKGROUND OF THE INVENTION

A. Field of the Invention

The present invention relates to a clutch apparatus for use in motorized vehicles, the clutch apparatus having a unique configuration which allows for ease of disassembly, the clutch apparatus being provided with a vibration dampening mechanism that includes an undulated spring and the clutch apparatus having a minimal axial thickness.

B. Description of the Related Art

A typical clutch apparatus includes a flywheel fixed to a crankshaft of an engine, a clutch cover assembly fixed to the flywheel, and a clutch disc disposed between the flywheel and the clutch cover assembly, the clutch disc being connected to an input shaft of a transmission. The clutch cover assembly includes a dish-like clutch cover, a pressure plate covered by the clutch cover and opposed to the flywheel, and a diaphragm spring supported by the clutch cover for biasing the pressure plate toward the flywheel. The clutch disk is disposed between the flywheel and the pressure plate. When a release device axially moves the diaphragm spring, a biasing force against the pressure plate is released, and the pressure plate moves away from the clutch disk.

The clutch apparatus is such that the clutch disc is not provided with a damper mechanism, and the flywheel is made up of several members or portions, between which a damper mechanism is arranged. In accordance with this structure, the flywheel includes an input part and an output part, where the output part is opposed to the input part with a damper mechanism therebetween. The flywheel is such that it has an increased moment of inertia, so that a resonance frequency of the clutch apparatus is lower that an idling rotation speed of the engine.

The above described clutch apparatus has several drawbacks, one being its axial thickness. The configuration of the apparatus is such that its axial length is prohibitively greater that a clutch apparatus configured with a damper mechanism within the clutch disc instead of within the flywheel. It is desirable to minimize the axial dimensions of a clutch apparatus for use in small motorized vehicles and in front wheel drive vehicles where the motor is transverse mounted within the engine compartment of the vehicle.

In another clutch apparatus, a flywheel may include several elements such as a plate member having a thin axial thickness. An inertia member is fixed to an outer peripheral portion of the plate member for increasing the moment of inertia to a desirable level. Further, the inertia member may have an axially elongated structure for preventing radial protrusion. Another portion of the flywheel may include seats or mounts for the connection with the clutch cover, so that the inertial member is arranged radially outside the seats. This results in increase in the overall radial dimensions of the clutch apparatus.

Another flywheel configuration is not provided with a clutch cover seat, and instead the clutch cover is rigidly fixed to an outer peripheral portion of the flywheel by caulking, welding or shrink fitting. Elimination of the clutch cover seats reduces the whole radial dimension of the clutch apparatus. However, in such an arrangement, when the clutch disc in the clutch apparatus is worn and must be renewed due to wear or abrasion, the entire clutch apparatus must first be removed from the crankshaft before the clutch apparatus can be disassembled. Further, to disassemble the clutch apparatus, the caulking, welding must be removed or cut first, or the apparatus must be heated if assembled using a shrink fitting method. In this case, reuse of the disassembled clutch cover may be impossible and the clutch cover must be replaced with the clutch disc.

Another aspect of the clutch apparatuses described above is that a plurality of strap plates are typically used to secure an outer peripheral portion of the pressure plate to the clutch cover. The strap plates are provided for ensuring that the pressure plate rotates together with the clutch cover. In the conventional clutch cover assembly, the clutch cover is provided at its outer peripheral portions with recesses for disposing the strap plates at circumferentially equally spaced three positions. These recesses reduce a strength of the clutch cover.

SUMMARY OF THE INVENTION

An object of the invention is to enable reuse of a clutch cover assembly after replacement of a clutch disc assembly in a clutch apparatus in which a clutch cover and a flywheel are fixed together without employing a clutch mount.

Another object of the invention is to reduce an axial dimension of a clutch apparatus by arranging an inertia member at an outer periphery without increasing a radial dimension of the clutch apparatus.

Still another object of the invention is couple a pressure plate and a clutch cover together without reducing a strength of the clutch cover.

In accordance with one aspect of the present invention, a clutch apparatus includes an input flywheel provided at its outer peripheral portion with a plurality of circumferentially spaced projections projecting radially outwardly an a clutch disc engaging surface. A clutch cover assembly having a clutch cover is provided at its outer peripheral edge with a plurality of engagement portions which are engageable with the projections of the flywheel respectively to prevent axial relative movement with respect to the input flywheel. The clutch cover assembly further includes fixing members which fix the input flywheel and the clutch cover relatively unrotatably. The fixing members are removable therefrom. A pressure plate is disposed between the clutch cover and the input flywheel. A biasing member is supported at an inner peripheral portion of the clutch cover for biasing the pressure plate toward the flywheel. A clutch disk assembly having a frictional coupling portion is disposed between the input flywheel and the pressure plate, the friction coupling portion engaging the clutch disc engaging surface.

Preferably, the engagement portions of the clutch cover and the projections of the input flywheel are engageable and dis-engageable by relative rotation therebetween in the circumferential direction.

Preferably, the clutch cover has a plurality of axially extending portions at an outer periphery thereof and an end of the axially extending portions are bent radially inward to form the engagement portions.

Preferably, the engagement portions and the projections are engaged such that the axially extending portions of the clutch cover are retained between the projections and the input flywheel against radially outward movement.

Preferably, each of the projections has an inclined groove on the engine side, the inclined groove becomes deeper in the radially inward direction, and the bent portions are bent so as to fit into the inclined grooves.

Preferably, the fixing member includes at least one plate non-rotatably fixed to the clutch cover and removable bolts which extend through the plate fixing the clutch cover to the input flywheel.

Preferably, the plates are fixed to an outer radial surface of the input flywheel and the bolts extend lengthwise in the radial direction with respect to the input flywheel.

Preferably, the clutch apparatus further includes a damper mechanism having a drive rotation member, a driven rotation member connected rigidly to the flywheel, and an elastic member disposed between the drive rotation member and the driven rotation member. The elastic member being compressed circumferentially in response to relative rotation between the drive rotation member and the driven rotation member. Further, the clutch apparatus includes a cylindrical inertia member fixed to an outer periphery of the drive rotation member so as to surround the damper mechanism, the flywheel, the clutch disc assembly and the clutch cover assembly, and the inertia member is formed with holes through which the fixing members can be manipulated.

In another aspect of the present invention, a clutch apparatus includes a damper mechanism having a drive rotation plate, a driven rotation plate and an elastic member elastically and circumferentially coupling the drive rotation plate and the driven rotation plate. A flywheel is rigidly connected to the driven rotation plate. The clutch apparatus also includes a clutch cover assembly having a clutch cover fixed to an outer peripheral portion of the flywheel, a pressure plate disposed between the clutch cover and the flywheel, and a biasing member supported by the clutch cover for biasing the pressure plate toward the flywheel. A clutch disk assembly having a frictional coupling portion is disposed between the flywheel and the pressure plate. A cylindrical inertia member extends axially to surround outer peripheries of the damper mechanism, the clutch disk assembly, the flywheel and the clutch cover assembly. Fixing members are disposed at a radially outer portion of the clutch cover assembly for fixing the drive rotation plate and the inertia member together.

Preferably, the fixing members include a plurality of bolts which are installed from an outer side of the clutch cover for fixing the input rotation plate and the inertia member together.

Preferably, the flywheel is provided with a plurality of projections which are circumferentially spaced from each other and are projecting radially outwardly, the clutch cover is formed with a plurality of engagement portions engaged with the projections, and the bolts are located circumferentially between the projections of the flywheel.

Preferably, the cylindrical inertial member is formed with a plurality of grooves at radially inward portions thereof through which the bolts may extend.

In another aspect of the present invention, a clutch apparatus is mounted on a crankshaft of an engine and includes a flexible plate connected rigidly with a crankshaft at an outer circumferential portion thereof, having a rigidity in the rotational direction of the clutch apparatus and flexible in the bending direction of the crankshaft and a damper mechanism having a drive member connected to an outer periphery of the flexible plate, a driven member and an undulated plate spring extending in the rotational direction of the clutch apparatus and compressible between the drive member and the driven member in the rotational direction. The clutch apparatus also includes a flywheel rigidly connected to an inner circumferential portion of the driven member and has a friction surface. A clutch disk assembly includes a friction engagement portion adjacent to the friction surface and a clutch cover assembly including a clutch cover having an outer periphery is connected to the flywheel, a pressure plate disposed within a clutch cover and adjacent to the friction engagement portion of the clutch disk assembly and an urging member supported by the clutch cover and urging the pressure plate against the clutch engagement portion.

Preferably, the undulate plate spring is formed with repeated folds so as to have an accordion-style ribbon-like shape.

Preferably, the undulate plate spring includes a plurality of loop sections and a plurality of lever sections, each of the lever sections extending from a corresponding end of the loop section.

Preferably, the drive member is composed of two drive disc plates outer peripheries of which are fixed to each other so as to form an annular chamber, and a driven member is a driven disc disposed in the annular chamber, and the undulated plate spring is located in the annular chamber.

Preferably, the annular chamber is filled with a fluid.

Preferably, the damper mechanism includes a viscous resistance generating mechanism for generating a viscous resistance in accordance with relative rotation between the input rotation member and the flywheel.

Preferably, a choke is defined between inner walls of the drive disc plate and the undulated plate spring.

In another aspect of the invention, a damper assembly mounted on a crankshaft of an engine includes a flexible plate connected rigidly with a crankshaft at an outer circumferential portion thereof, having a rigidity in the rotational direction of the clutch apparatus and flexible in the bending direction of the crankshaft. The apparatus also includes a damper mechanism having two drive disc plates outer peripheries of which are fixed to each other so as to form an annular chamber, and a driven disc disposed in the annular chamber. An undulated plate spring is located in the annular chamber and extends in the rotational direction of the clutch apparatus and is compressible between the drive member and the driven member in the rotational direction.

Preferably, the undulated plate spring is repeatedly folded so as to make accordion-style ribbon-like shape.

Preferably, the undulated plate spring has a plurality of loop sections and a plurality of lever sections extending from opposite ends of the loop section.

Preferably, the annular chamber is filled with a fluid.

Preferably, the damper mechanism includes a viscous resistance generating mechanism for generating a viscous resistance in accordance with relative rotation between the input rotation member and the flywheel.

Preferably, wherein a choke is defined between inner walls of the drive disc plate and the undulated plate spring.

In accordance with another aspect of the present invention, a clutch cover assembly is fixed to a flywheel and includes a clutch cover having an outer peripheral portion fixed to the flywheel, a pressure plate disposed between the clutch cover and the flywheel, a first biasing member in a circular plate form carried by the clutch cover for biasing the pressure plate toward the flywheel, and a plate member unrotatably coupling an inner peripheral portion of the clutch cover to an outer peripheral portion of the pressure plate.

Preferably, the plate member is formed of an annular portion fixed to the clutch cover and a plurality of coupling portions formed integrally with the annular portion, extending in a circumferential direction and fixed to the pressure plate.

Preferably, the clutch cover assembly further includes a supporting mechanism disposed at the inner peripheral portion of the clutch cover connected to the plate member and supporting a radially middle portion of the first biasing member.

Preferably, the supporting mechanism has a plurality of fixing portions extending from the clutch cover through the first biasing member and fixed to the plate member, and two wire rings disposed between the clutch cover and the first biasing member and between the plate member and the first biasing member, respectively.

Preferably, a second biasing member is supported by the plate member, for biasing the first biasing member away from the pressure plate when the clutch is released.

Preferably, the supporting mechanism has a plurality of fixing portions extending from the clutch cover through the first biasing member and fixed to the plate member, and the clutch cover and the plate member are provided with annular projections supporting the first biasing member located therebetween.

Preferably, a second biasing member supported by the plate member, for biasing the first biasing member away from the pressure plate when the clutch is released.

Preferably, the plate member is formed of a plurality of plate members, fixed at one of its end to the clutch cover, and fixed at the other end to an inner peripheral portion of the pressure plate.

Preferably, a supporting mechanism is disposed at the inner peripheral portion of the clutch cover connected to the plate member and supporting a radially middle portion of the first biasing member.

Preferably, the supporting mechanism has a plurality of fixing portions extending from the clutch cover through the first biasing member, an annular plate fixed to the fixing portions and the plate member, and two wire rings disposed between the clutch cover and the first biasing member and between the first biasing member and the annular plate, respectively.

Preferably, a second biasing member is supported by the annular plate, and biasing the outer peripheral portion of the first biasing member away from the pressure plate.

Preferably, the supporting mechanism has a plurality of fixing portions extending from the clutch cover through the first biasing member and fixed to the plate member, and an annular supporting plate fixed to the fixing portion and fixed to one of ends of the plate member, and the clutch cover and the annular plate are provided with annular projections supporting the biasing member located therebetween.

Preferably, a second biasing member is supported by the annular plate, for biasing the first biasing member away from the pressure plate when the clutch is released.

During the assembly process of the clutch cover assembly to the flywheel, each of the bent engagement portions of the clutch cover is moved through the space defined between the engagement portions of the flywheel, and then the clutch cover is rotated to move the bent engagement portion into engagement with the engagement portion of the flywheel. Subsequently, the flywheel is unrotatably fixed to the clutch cover by the fixing member. When the clutch cover assembly is to be removed from the flywheel, operations are performed in an opposite manner. As described above, bolt seats or mounts are eliminated from the flywheel, whereby the flywheel has a reduced radial dimension. Since the clutch cover is circumferentially engageable and dis-engageable with respect to the flywheel, it can be removed without breakage, and the removed clutch cover can be reused.

In the clutch apparatus, the flywheel is not provided with the clutch mount, and the clutch cover is fixed to the flywheel via the engagement portions. Therefore, the inertia member can be arranged at a more radially inward position, and a radial dimension of the whole clutch apparatus may be reduced.

If a plurality of bolts are inserted from the clutch cover side, the bolts can be fastened easily. This is allowed owing to the fact that the clutch mount is eliminated from the flywheel, and the plurality of bolts are disposed at more radially inner positions.

In the structure where the bolts are fixed at positions circumferentially between the protruded engagement portions of the flywheel, the bolts can be arranged at further radially inner positions. As a result, the clutch apparatus has a reduced radial dimension, and the whole apparatus has a compact structure.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
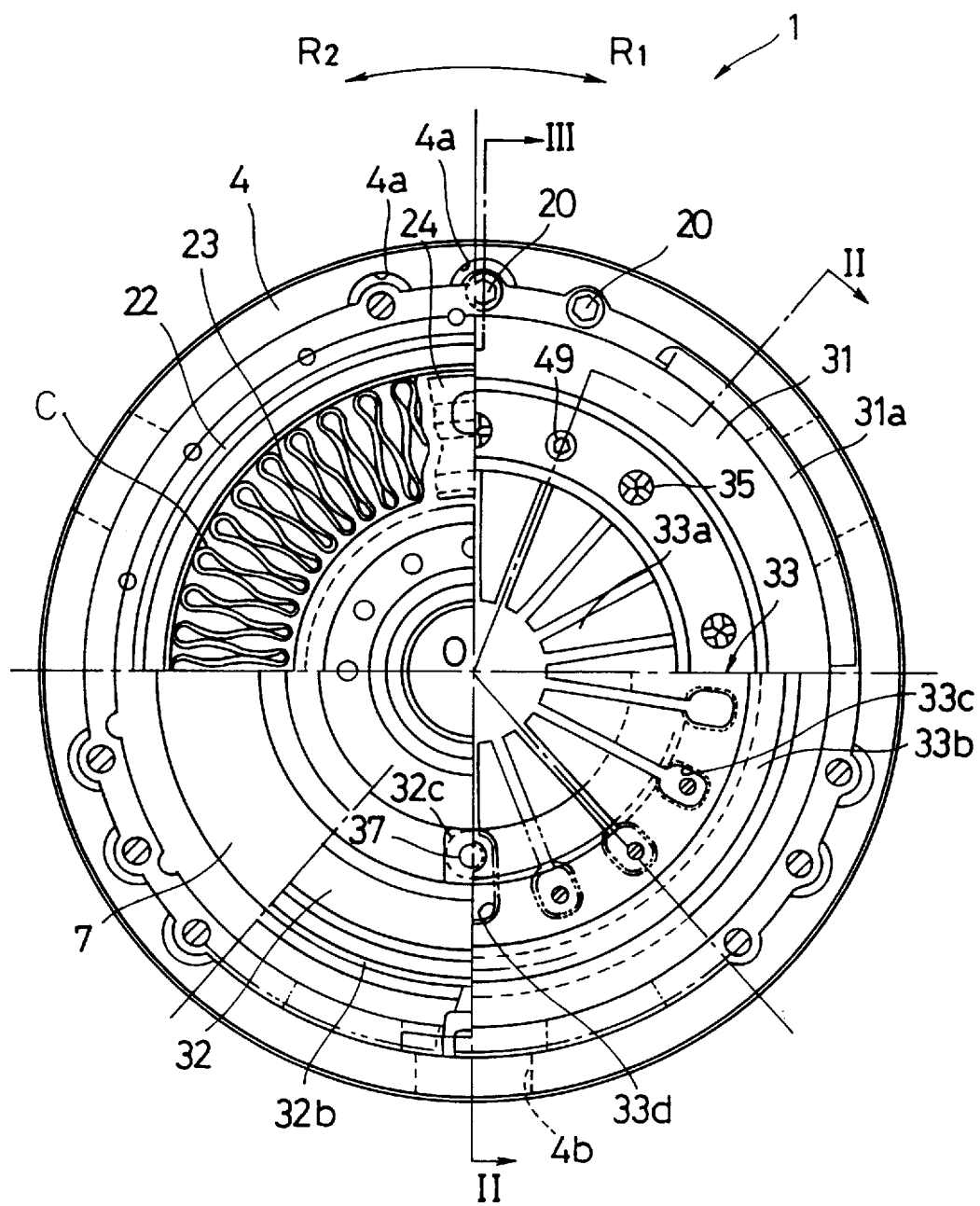
FIG. 1 is part cross-section, part elevational end view of a clutch apparatus having a clutch cover assembly in accordance with a first embodiment of the present invention.
Figure 2:
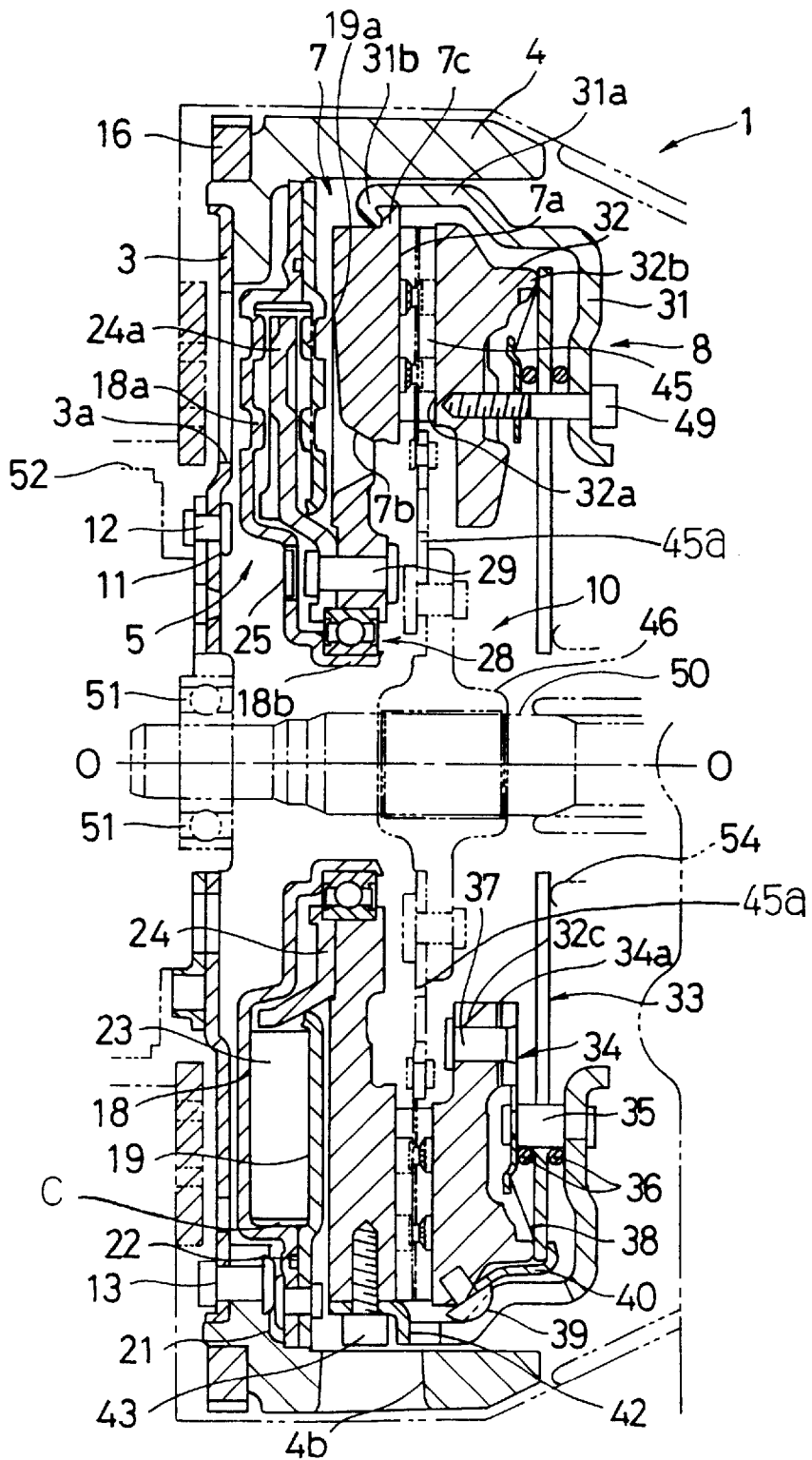
FIG. 2 is a cross-section of the clutch apparatus depicted in FIG. 1, taken along the line II—II, looking in the direction of the arrows.
Figure 3:
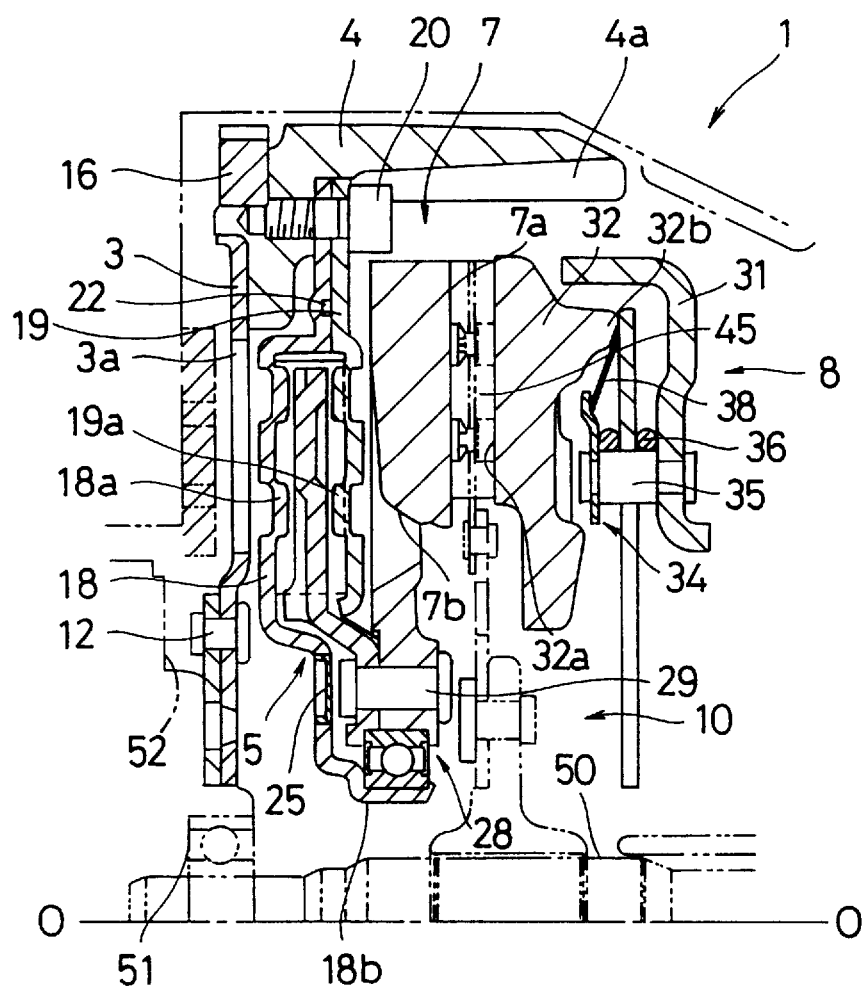
FIG. 3 is a fragmentary cross section of the clutch apparatus depicted in FIGS. 1 and 2, taken along the line III-0 in FIG. 1, looking in the direction of the arrow.

A clutch apparatus 1 in accordance with a first embodiment of the invention is shown in FIGS. 1, 2 and 3 and includes, a flexible plate 3, an inertia member 4, a viscous damper mechanism 5, a flywheel 7, a clutch cover assembly 8 and a clutch disk assembly 10. An engine (not shown) is disposed to the left side in FIGS. 2 and 3, and a transmission (not shown) is disposed to the right side. The line 0—0 in FIGS. 2 and 3 represents the rotational axis about which the clutch apparatus may rotate during torque transmission.

The flexible plate 3 is a circular disk-like member, and an annular plate member 11 is fixed to the inner peripheral portion thereof by rivets 12. The inner peripheral portion of the flexible plate 3 is fixed together with the plate member 11 to a crankshaft 52 of the engine (not shown). The flexible plate 3 is provided at its radially middle portion with a plurality of circular apertures 3a which are circumferentially equally spaced from each other. The flexible plate 3 is generally rigid in the circumferential direction, but is flexible in bending directions, where the bending directions are defined as the directions of elastic deformation of the flexible plate 3 generally along the line 0—0 or about a point on the line 0—0 which coincides with the center of the flexible plate 3.

The inertia member 4 is fixed to the outer peripheral portion of the flexible plate 3 by rivets 13. The inertia member 4 is an axially elongated cylindrical member. A ring gear 16 is fixed onto the inertia member 4. The inertia member 4 is provided with three operation apertures 4b, which are circumferentially equally spaced from each other and radially penetrates the member 4.

The viscous damper mechanism 5 includes a first input plate 18, a second input plate 19, an undulated plate-like spring 23 and a driven member 24. The first input plate 18 is an annular member disposed beside the flexible plate 3. The first input plate 18 has an outer peripheral portion which is in contact with the inner peripheral surface of the inertia member 4. The inner peripheral portion of the first input plate 18 forms an inner projection 18b which extends toward the transmission (not shown). The first input plate 18 has a radially middle portion which extends toward the engine as shown in FIGS. 2 and 3. The second input plate 19 is an annular member disposed beside the first input plate 18. The outer peripheral end of the second input plate 19 is in contact with the inner peripheral surface of the inertia member 4. The outer peripheral portions of the first and second input plates 18 and 19 are in contact with each other, and are fixed together by rivets 21 with a seal ring 22 therebetween. The second input plate 19 has an inner diameter smaller than that of the first input plate 18.

The outer peripheral portions of the first and second input plates 18 and 19 are fixed to the inertia member 4 by circumferentially spaced apart groups of three bolts, each group including circumferentially spaced apart bolts 20, shown in FIGS. 1 and 3. Each bolt 20 is inserted from the transmission side through a space between extensions 31 of a clutch cover 31, which will be described later more in detail. The inertia member 4 is provided with grooves 4a for accommodating the bolts 20, respectively.

A space defined by the first and second input plates 18 and 19 forms a viscous fluid chamber which is filled with viscous fluid such as an operation oil. A pair of undulated plate springs 23 are disposed in this viscous fluid chamber. As can be seen from FIG. 1, each undulated plate spring 23 is formed from an elongated strip of material, for instance metal, where the elongated strip of material has been bent accordion style to form the undulated plate spring 23. The undulated plate spring 23 shown in FIG. 1 has an arcuate shape due to insertion in the clutch apparatus 1.

Figure 13:
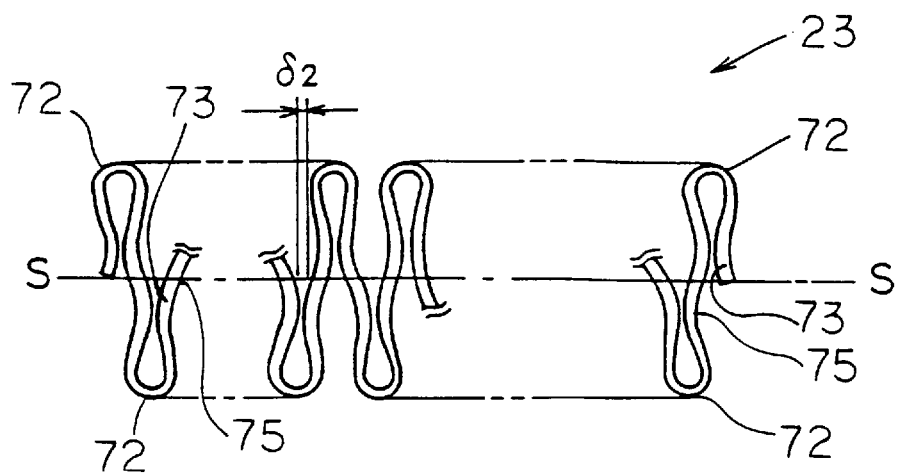
FIG. 13 is a fragmentary end view of an undulated plate-like spring of the clutch apparatus, shown removed in an uncompressed state.

One undulated plate spring 23 is shown removed from the clutch apparatus 1 in FIG. 13. The undulated plate spring 23 shown in FIG. 13 does not have the arcuate shape, but rather has a generally straight elongated shape. The folds of the undulated plate spring 23 define two distinct parts of the spring, loop parts or ring portions 72 and lever portions 75. Ends 73 of each ring portion 72 are joined to lever portions 75 defining the continuous ribbon like configuration of the undulated plate spring 23. Between the ends 73 of each ring portion 72, a gap $\delta_2$ is defined when the undulated plate spring 23 is in an unstressed, uncompressed state as shown in FIG. 13.

Figure 14:
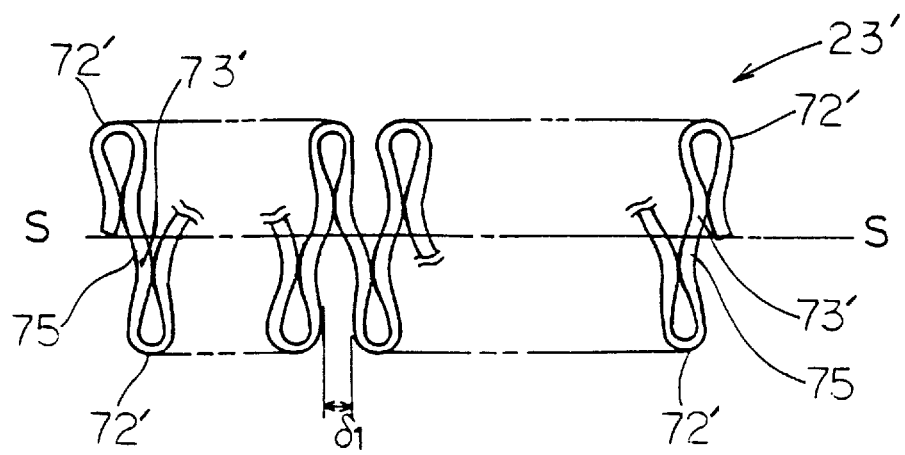
FIG. 14 is similar to FIG. 13, showing an alternate embodiment of the undulated plate-like spring.

In an alternate embodiment of the present invention, the undulated plate spring 23' may be configured as shown in FIG. 14 where the inner ends 73' of each ring portion 72' contact each other. However, in both embodiments of the undulated plate springs 23 and 23', a gap $\delta_1$ is defined between adjacent ring portions 72 and 72' of the undulated plate springs 23 and 23'. Use of the undulated plate spring 23 reduces an axial dimension of the viscous damper mechanism 5 compared with a conventional structure using coil springs.

A choke C, shown in FIGS. 1 and 2, is defined between a radial outer edge of the undulated plate spring 23 and the inner radial edge of the input plates 18 within the viscous fluid chamber defined by the plates 18 and 19. As the spring 23 is compressed due to relative rotation between the flywheel 7 and the plate 18, fluid is forced through the choke C providing fluid flow resistance dampening vibration.

The driven member 24 is in the form of an annular plate, and has engagement portions 24a extending radially outwardly from its annular portion. The engagement portions 24a extend into the viscous fluid chamber, and are in contact with circumferentially opposite ends of the undulated plate springs 23. The first and second input plates 18 and 19 have supporting portions 18a and 19a, which axially protrude, and are in contact with circumferentially opposite ends of the undulated plate springs 23.

The flywheel 7 has an annular friction surface 7a at its transmission side. The flywheel 7 is also provided with communication apertures 7b communicating its opposite surfaces with each other. The driven member 24 is fixed to the inner peripheral end of the flywheel 7 by rivets 29. The inner peripheral ends of the flywheel 7 and driven member 24 are supported by the inner projections 18b of the first input plate 18 through a bearing 28. The flywheel 7 is provided at its outer peripheral surface with three engagement portions 7c which are circumferentially equally spaced from each other. Each engagement portion 7c is projected radially outwardly. An end surface of the engagement portion 7c facing the engine side is inclined with respect to the radial direction such that the radially inner portion of the engagement portion 7c has a smaller axial length or thickness.

The clutch cover assembly 8 includes, as its major components, the clutch cover 31 as well as a pressure plate 32, a diaphragm spring 33, a coupling plate 34, stud pins 35, two wire rings 36 and a conical spring 38. The clutch cover 31 is a dish-like member having a large opening at its center, and is provided at its outer peripheral portion with extensions 31a of a predetermined width, which are circumferentially spaced from each other and extend axially toward the flywheel 7. Each extension 31a is provided at its free end with a bent portion 31b, which is bent radially inwardly, and is engaged with the engagement portion 7c of the flywheel 7. This prevents relative movement of the clutch cover 31 with respect to the flywheel 7 toward the transmission. Each extension 31a is provided at its end with a circumferentially extending recess, which is engaged with a circumferentially extending plate 42. The plate 42 is fixed to the outer peripheral surface of the flywheel 7 by a bolt 43. In this manner, the clutch cover 31 is circumferentially unrotatable with respect to the flywheel 7. By eliminating the bolt seat or mount from the flywheel as described above, the flywheel 7 has a reduced radial dimension, as compared to prior art configurations.

The pressure plate 32 is an annular member disposed inside the clutch cover 31. The pressure plate 32 has a pressing surface 32a opposed to the friction surface 7a of the flywheel 7. The pressure plate 32 is provided at the surface opposite to the pressing surface 32a with an annular projection 32b projected toward the transmission. The pressure plate 32 further has a flange 32c extending radially inwardly.

The diaphragm spring 33, which is a circular or annular member, has an outer peripheral end located between the pressure plate 32 and the clutch cover 31, and has an inner peripheral end located near a main drive shaft 50. The diaphragm spring 33 is provided with a plurality of slits, which extend radially outwardly from the inner periphery, and define a plurality of levers 33a between them. Radially outer end portions of the slits form first openings 33c, respectively. Among the slits, circumferentially equally spaced three slits are provided with second openings 33d. The second opening 33d has a radial length longer than the first opening 33c, and its radially inner portion is located near the flange 32c of the pressure plate 32. The diaphragm spring 33 has an annular pressing portion 33b, which is formed radially outside the levers 33a. The annular pressing portion 33b has an inner peripheral portion, which is located between and supported by wire rings 36, described below, and has an outer peripheral portion, which is in contact with the annular projection 32b of the pressure plate 32.

A plurality of stud pins 35, each of which is fixed at one of its ends to a radially inner portion of the clutch cover 31, extend through first openings 33c in the diaphragm spring 33 toward the pressure plate 32. The other end of each stud pin 35 is fixed to the coupling plate 34. At the position radially outside the stud pins 35, wire rings 36 are disposed between the coupling plate 34 and the diaphragm spring 33 and between the diaphragm spring 33 and the clutch cover 31, respectively. Thus, the inner peripheral portion of the annular pressing portion 33b of the diaphragm spring 33 is supported by the pair of wire rings 36.

The coupling plate 34 is an annular member, and its inner peripheral portion is integrally provided with three coupling portions 34a which extend in the circumferential direction indicated by R1. The end of the coupling portion 34a is fixed to the flange 32c of the pressure plate 32 by rivets 37. The positions of the rivets 37 correspond to the second openings 33c in the diaphragm spring 33, respectively. The coupling portion 34a has a high rigidity in the circumferential direction, and is flexible in the axial direction. The coupling portion 34a biases the pressure plate 32 to move it away from the flywheel 7.

The conical spring 38 is disposed around the coupling plate 34. The inner peripheral edge of the conical spring 38 is supported by the coupling plate 34, and the outer peripheral portion is supported by the outer peripheral edge of the diaphragm spring 33, i.e., the portion near the annular projection 32b of the pressure plate 32 so as to bias this portion away from the pressure plate 32.

As described above, the coupling plate 34 couples the clutch cover 31 and the pressure plate 32 to each other, and supports the conical spring 38 and the wire rings 36. As described above, the coupling plate 34 has multiple functions, so that the number of parts can be reduced as compared to prior art configurations.

A plurality of engagement portions 40 are fixed to the pressure plate 32 by fixing pins 39, and have ends which hold the outer peripheral edge of the diaphragm spring 33 on the annular projection 32b of the pressure plate 32.

The clutch disk assembly 10 has a friction facing 45, which is disposed between the friction surface 7a of the flywheel 7 and the pressing surface 32a of the pressure plate 32. The friction facing 45 is fixed to a hub 46 via a plate member 45a.

The main drive shaft 50 which extends from the transmission is engaged with the hub 46 via a spline. An end of the main drive shaft is rotatably supported by a crankshaft 52 via a bearing 51. A release device 54 is in contact with the inner peripheral end of the diaphragm spring 33, and more specifically contacts the surface thereof which faces the transmission (not shown).

Although bolts 49 are shown in FIG. 1, the bolts 49 are removed when the clutch apparatus 1 is in operation, as is described below. The bolts 49 are installed in order to temporally fix the clutch cover 31 and the pressure plate 32 assembling or disassembling the clutch cover assembly 8 to and from the flywheel 7. The plurality of bolts 49 extend through apertures formed at radially inner portions of the clutch cover 31, the first openings 33 in the diaphragm spring 33 and the coupling plates 34, and is screwed into the pressure plate 32.

An operation of the clutch apparatus 1 will be described below.

When the crankshaft of the engine rotates, torque is transmitted through the flexible plate 3 and the viscous damper mechanism 5 to the flywheel 7, and is further transmitted through the clutch disc assembly 10 to the main drive shaft 50. The pressure plate 32 rotates together with the clutch cover 31 coupled thereto by the coupling plate 34. As described above, the rotation of the pressure plate 32 is assured by connection to the coupling plate 34 which couples the inner peripheral portion of the pressure plate 32 to the inner peripheral portion of clutch cover 31. Thus it is not necessary to provide recesses for accommodating the strap plate at the outer peripheral portion of the clutch cover 31, in contrast to the prior art. Therefore, the clutch cover 31 has an increased strength when compared to the prior art.

The inertia member 4 is fixed to the first and second input plates 18 and 19, thus providing a sufficiently large inertia moment provided in the clutch apparatus 1. Further, the clutch apparatus 1 may be divided into an input portion and an output portion, the division between the input portion and the output portion being the undulated plate spring 23. Since the inertia member 4 is arranged at an outer peripheral portion of the clutch apparatus 1, the first and second input plates 18 and 19 which at least partially define a viscous fluid chamber, can have a reduced axial thickness as compared to prior art configurations. Further, the whole clutch apparatus 1 can have a reduced axial thickness. Further, the inertia member 4 has a large axial length, so that a radial dimension of the whole clutch apparatus 1 is reduced, compared to prior art configurations.

As described above, the radial dimension of the clutch apparatus 1 is reduced compared to the prior art in spite of the configuration of the inertia member 4 being arranged at the radially outer portion of the viscous damper mechanism 5. This is owing to the fact that prior art clutch mounts are eliminated from the flywheel 7, and the inertia member 4 is disposed at a more radially inner position.

When a bending vibration is transmitted from the engine, this vibration is absorbed by bending of the flexible plate 3 in the bending direction.

When a torsional vibration is transmitted from the engine, the first and second input plates 18 and 19 periodically rotate relatively to the flywheel 7. In this operation, the undulated plate spring 23 is compressed circumferentially, and viscous fluid in the viscous fluid chamber flows between the undulated plate spring 23 and the first and second input plates 18 and 19 to cause a viscous resistance. As a result, the torsional vibration is effectively damped.

When a driver depresses a clutch pedal, the end of the release device 54 pushes the radially inner end of the diaphragm spring 33 toward the engine. As a result, the radially outer end of the diaphragm spring 33 moves away from the annular projection 32b of the pressure plate 32. Thereby, the biasing force of the coupling portion 34a of the coupling plate 34 moves the pressure plate 32 away from the friction facing 45 of the clutch disc assembly 10. Consequently, there is an interruption in the torque transmission from the flywheel 7 to the clutch disc assembly 10. In the release operation described above, the conical spring 38 applies a load directed toward the transmission against the diaphragm spring 33, so that the release load is reduced, and leg-power from a vehicle operator necessary for operation of a clutch pedal is reduced.

When assembling the clutch apparatus 1, the flywheel 7 is fixed in advance to the clutch cover assembly 8. More specifically, the clutch cover assembly 8 is first fixed axially unmovably to the pressure plate 32 by the bolts 49. Owing to the bolts 49, the clutch cover 31 and the pressure plate 32 are adjacent to each other in spite of the load applied from the diaphragm spring 33. The clutch cover assembly 8 held in this state is moved toward the flywheel 7, so that the projections 31a of the clutch cover 31 are moved through the spaces between the engagement portions 7c of the flywheel 7. Then, the clutch cover assembly 8 is rotated to engage the bent portions 31b with the engagement portions 7c, respectively. Thereafter, the bolts 43 and the plate 42 are operated through the operation apertures 4b to fix them to the flywheel 7, whereby the clutch cover 31 and the flywheel 7 are prevented from relative rotation. By removing the bolts 49, the diaphragm spring 33 biases the pressure plate 32 to move it away from the clutch cover 31, whereby the bent portions 31b and the engagement portions 7c are axially and rigidly coupled together.

The mechanism formed of the viscous damper mechanism 5, flywheel 7, clutch cover assembly 8 and clutch disc assembly 10 is fixed by the bolts 20 to the flexible plate 3 and the inertia member 4. The bolts 20 extend through portions of the clutch cover 31 other than the projections 31a, portions of the flywheel 7 other than the engagement portions 7c, and grooves 4a of the inertia member 4, and fix the outer peripheral portions of the first and second input plates 18 and 19 to the inertia member 4. Since the bolts 20 are inserted and handled from the transmission side, the workability or operability is improved as compared with the prior art. The reason why the bolts 20 can be fixed from the transmission side is that bolt mounts common in prior art configurations is eliminated from the flywheel of the present invention, and the bolts 20 are disposed at more radially inner positions.

When the clutch disc assembly 10 is to be replaced or repaired, the clutch cover 31 and the pressure plate 32 are fixed together by the bolts 49. Then, the bolts 43 and the plate 42 are removed, and the clutch cover assembly 8 is rotated to disengage the bent portions 31b from the engagement portions 7c. As described above, replacement of the clutch disc assembly 10 can be performed only by removing the clutch cover assembly 8 from the flywheel 7, and therefore can be performed easily. If the outer peripheral portion of the clutch cover were caulked to the flywheel, it would be necessary to remove the flywheel in addition to the clutch cover 31. Since the clutch cover 31 is circumferentially engageable and dis-engageable with the flywheel 7, it can be removed from the flywheel 7 without breakage. Therefore, the removed clutch cover 31 can be reused.

Second Embodiment

Figure 4:
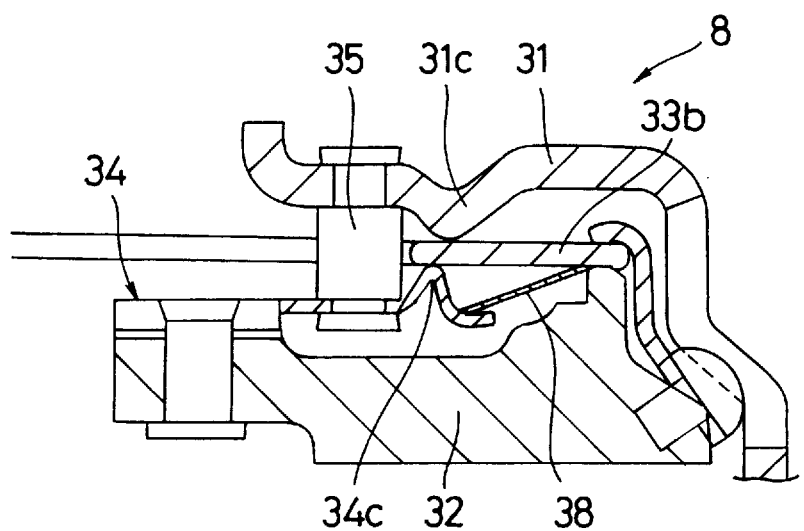
FIG. 4 is a fragmentary cross section of a clutch cover assembly shown removed from the clutch apparatus in accordance with a second embodiment of the present invention.

In the clutch cover assembly 8 shown in FIG. 4, the wire rings 36 in the first embodiment are not employed, so that the number of parts is reduced. Alternatively, the clutch cover 31 and the coupling plate 34 are provided with annular bent portions 31c and 34c, respectively. The diaphragm spring 33 is confined between annular bent portions 31c and 34c.

Third Embodiment

Figure 5:
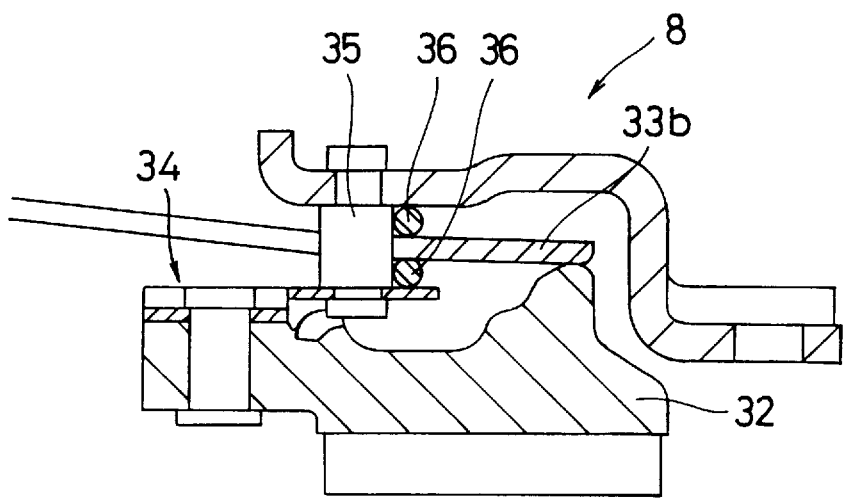
FIG. 5 is a fragmentary cross section of a clutch cover assembly shown removed from the clutch apparatus in accordance with a third embodiment of the present invention.

The clutch cover assembly 8 shown in FIG. 5 differs from the first embodiment in that the conical spring 38 is eliminated. The effects of the third embodiment are generally the same as those of the first embodiment except for the omission of the conical spring 38.

Fourth Embodiment

Figure 6:
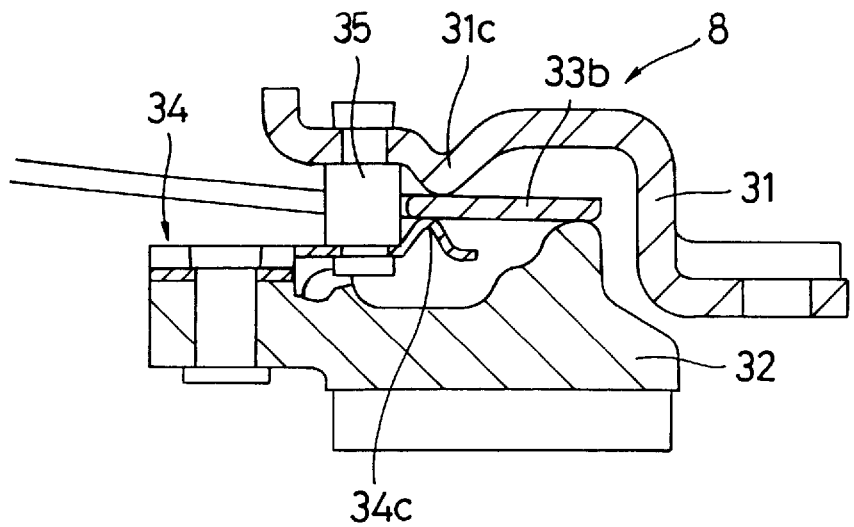
FIG. 6 is a fragmentary cross section of a clutch cover assembly shown removed from the clutch apparatus in accordance with a fourth embodiment of the present invention.

The clutch cover assembly 8 shown in FIG. 6 is the same as that of the second embodiment shown in FIG. 4 except for the conical spring 38 is not employed. Its effects are the same as those by the second embodiment except for the effect by the conical spring 38.

Fifth Embodiment

Figure 7:
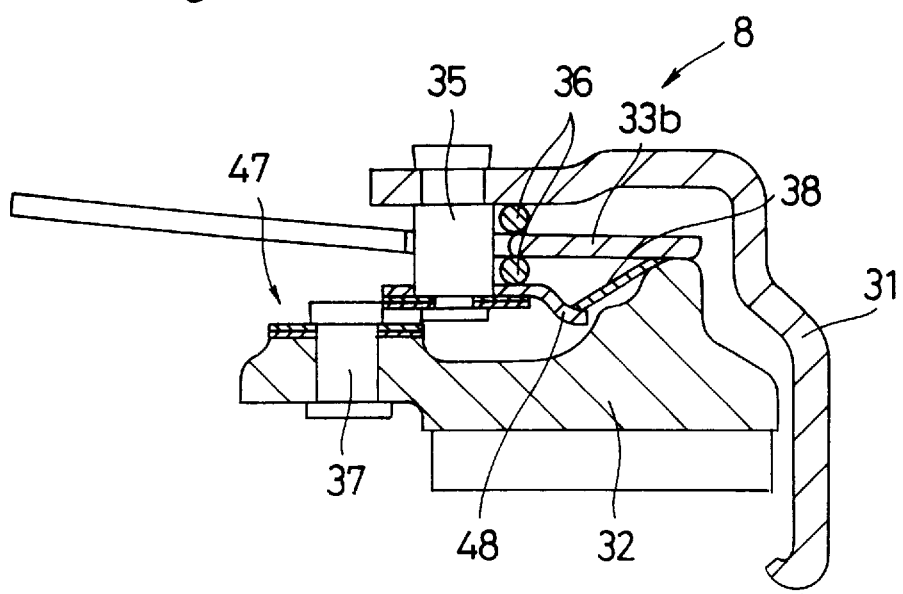
FIG. 7 is a fragmentary cross section of a clutch cover assembly shown removed from the clutch apparatus in accordance with a fifth embodiment of the present invention.
Figure 11:
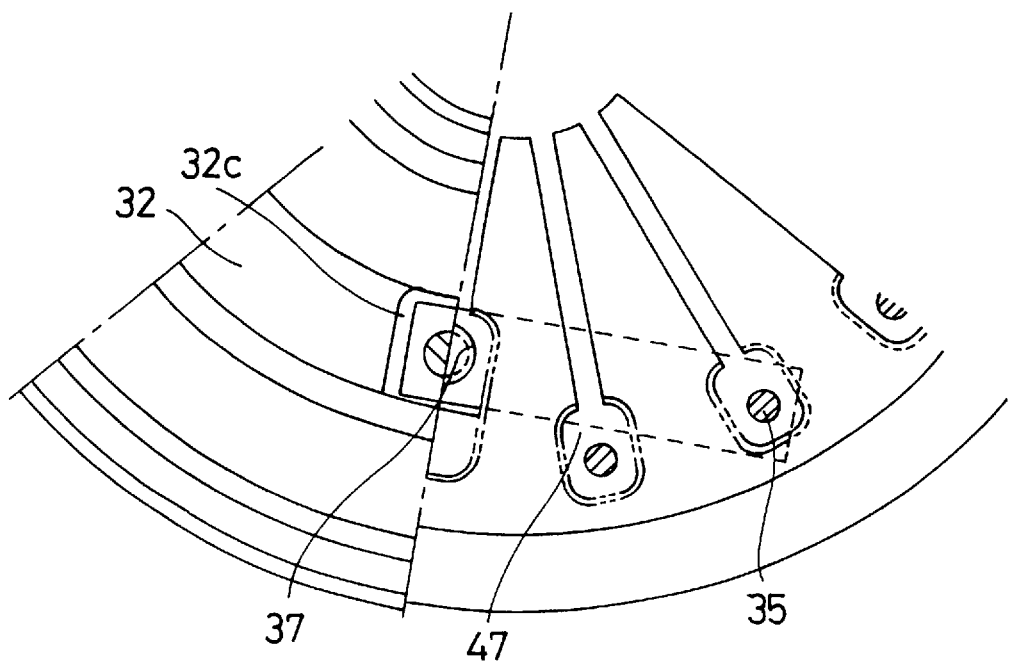
FIG. 11 is a fragmentary, part cutaway, part elevational view of a clutch cover assembly shown removed from the clutch apparatus in accordance with the fifth embodiment of the present invention.

In the clutch cover assembly 8 shown in FIGS. 7 and 11, a coupling plate 48 and strap plates 47 formed of a plurality of plates 47 are fixed to an end of each stud pin 35 fixed to the clutch cover 31. The plate member 48 is an annular member, and supports the wire ring 36 and the conical spring 38. The other end of each strap plate 47 is fixed to the flange 32c of the pressure plate 32 by the rivet 37. The strap plate 47 couples the pressure plate 32 to the clutch cover 31 for integral rotation, and biases the pressure plate 32 away from the flywheel. In this structure, since the clutch cover 31 and the pressure plate 32 are fixed together at their radially inner portions, it is not necessary to from recesses for accommodating the strap plates at the clutch cover 31 in contrast to the prior art. Consequently, the clutch cover 31 has an improved strength. The plate member 48 supports the wire ring 36 and the conical spring 38.

Sixth Embodiment

Figure 8:
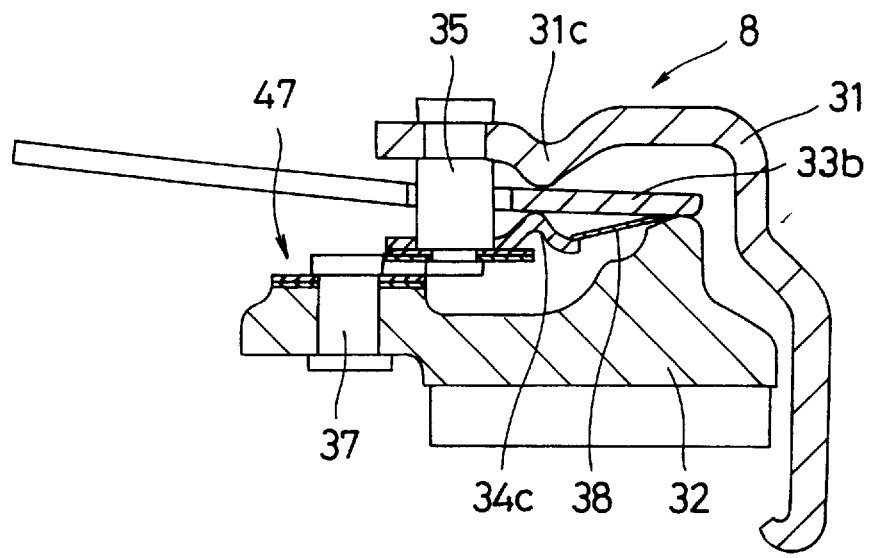
FIG. 8 is a fragmentary cross section of a clutch cover assembly shown removed from the clutch apparatus in accordance with a sixth embodiment of the present invention.

The clutch cover assembly 8 shown in FIG. 8 differs from the fifth embodiment in that the wire ring 36 is not employed. Alternatively, the clutch cover 31 and the plate member 48 are provided with annular bent portions 31c and 48c, respectively. The diaphragm spring 33 is pinched between the annular bent portions 31c and 48c.

Seventh Embodiment

Figure 9:
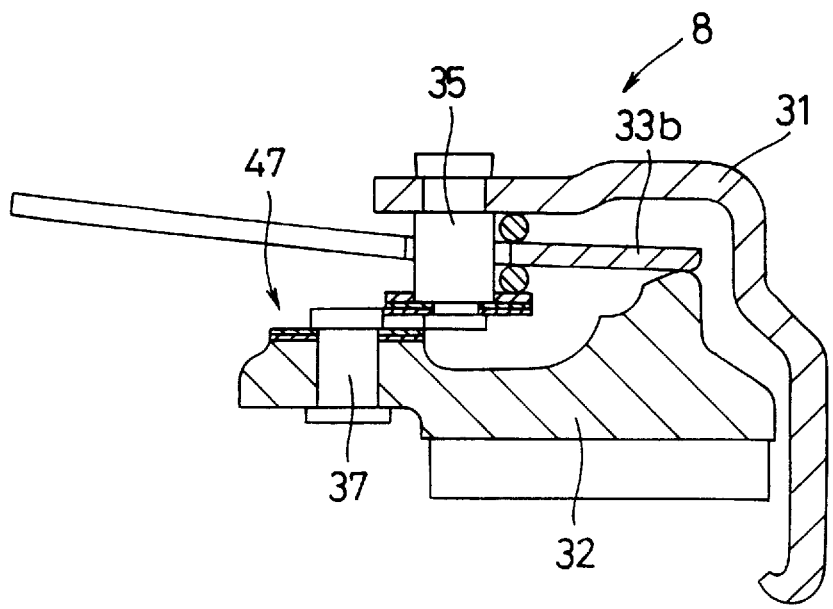
FIG. 9 is a fragmentary cross section of a clutch cover assembly shown removed from the clutch apparatus in accordance with a seventh embodiment of the present invention.

The clutch cover assembly 8 shown in FIG. 9 differs from the fifth embodiment in that the conical spring 38 is not employed. It can achieve the same effects as those by the fifth embodiment except for the effect by the conical spring 38.

Eighth Embodiment

Figure 10:
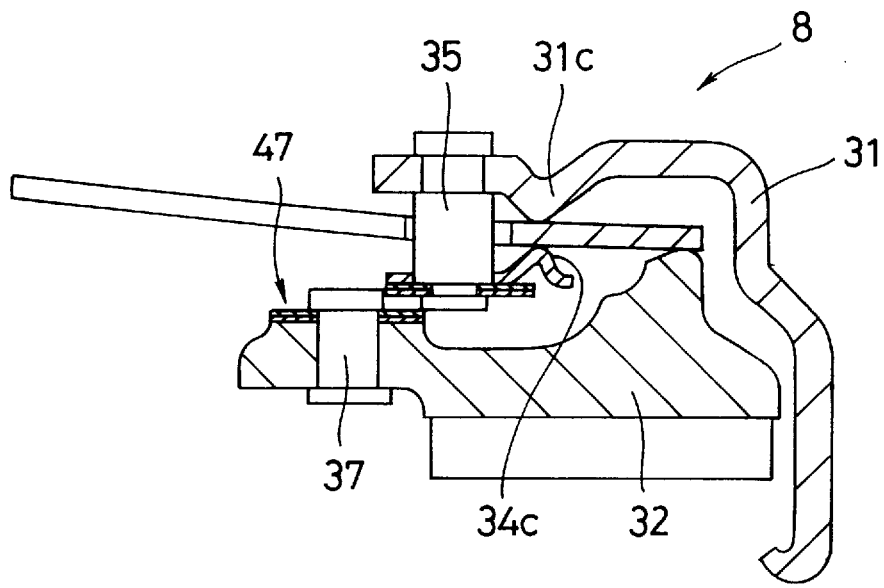
FIG. 10 is a fragmentary cross section of a clutch cover assembly shown removed from the clutch apparatus in accordance with an eighth embodiment of the present invention.

The clutch cover assembly 8 shown in FIG. 10 differs from the sixth embodiment in that the conical spring 38 is not employed. It can achieve the same effects as those by the sixth embodiment except for the effect by the conical spring 38.

Ninth Embodiment

Figure 12:
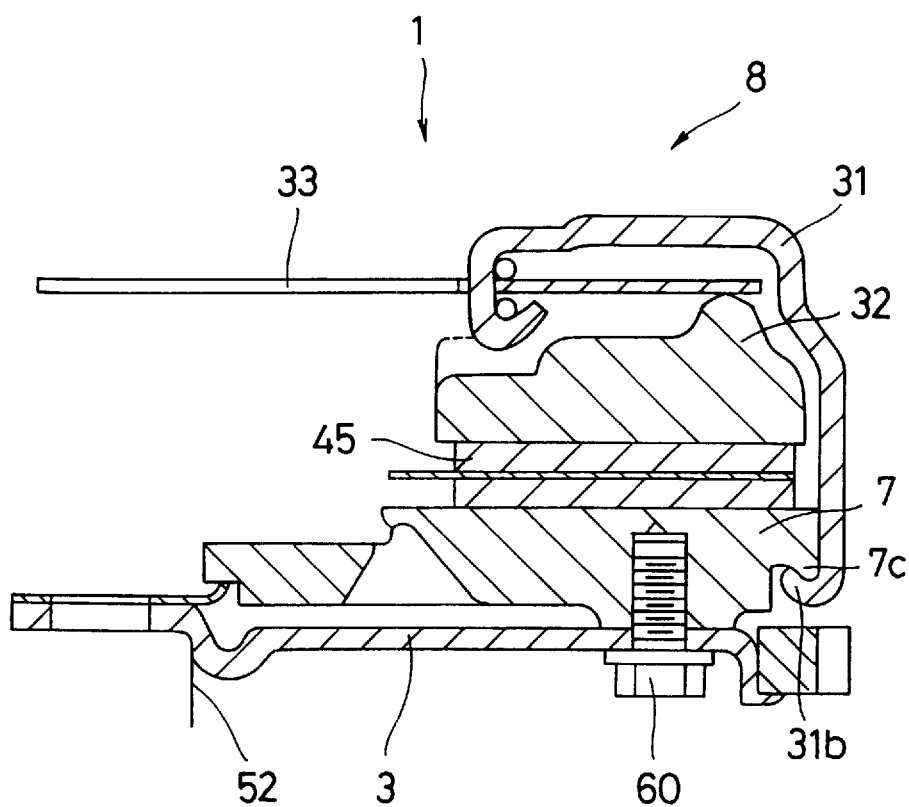
FIG. 12 is a fragmentary cross-section of a clutch cover assembly shown removed from the clutch apparatus in accordance with a ninth embodiment of the present invention.

The clutch apparatus 1 shown in FIG. 12 is formed of the flexible plate 3, flywheel 7 and clutch cover assembly 8. The outer peripheral portion of the flexible plate 3 is fixed to the flywheel 7 by bolts 60. The flywheel 7 is provided at its outer peripheral surface with engagement portions 7c which are circumferentially equally spaced from each other.

The clutch cover assembly 8 is formed of the clutch cover 31, pressure plate 32 and diaphragm spring 33. The clutch cover 31 is provided at its outer peripheral portions with bent portions 31b engaged with the engagement portions 7c. Each bent portion 31b is circumferentially engageable and dis-engageable with the engagement portion 7c. The frictional coupling portion 45 of the clutch disk is disposed between the pressure plate 32 and the flywheel 7.

In this embodiment, since the flywheel 7 and the clutch cover assembly 8 are fixed together as described above, fixing to the flexible plate 3 is facilitated.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A clutch apparatus mountable on a crankshaft of an engine comprising:

an input flywheel provided at its outer peripheral portion with a plurality of circumferentially spaced projections projecting radially outwardly and having a clutch disc engaging surface on a first axial side thereof, said projections being spaced apart from a second axial side thereof defining an axially extending space between a radial outer edge of said second axial sided said projections;

a clutch cover assembly having a clutch cover provided at its outer peripheral edge with a plurality of engagement portions which are engageable with said projections of said input flywheel respectively to prevent axial relative movement toward said first axial side with respect to said input flywheel, said clutch cover assembly further including fixing members fixing said input flywheel and said clutch cover relatively unrotatably and being removable therefrom, a pressure plate disposed between said clutch cover and said input flywheel, and a biasing member supported at an inner peripheral portion of said clutch cover for biasing said pressure plate toward said input flywheel, said engagement portions being disposed in said axially extending space and said engagement portions being spaced apart from said radial outer edge of said second axial side of said input flywheel, and in response to removal of said fixing members said engagement portions and said clutch cover are moveable in an axial direction toward said radial outer edge of said second axial side within said space; and a clutch disk assembly having a frictional coupling portion disposed between said input flywheel and said pressure plate, said friction coupling portion engaging said clutch disc engaging surface.

2. A clutch apparatus according to claim 1, wherein said engagement portions of said clutch cover and said projections of said input flywheel are engageable and disengageable by relative rotation therebetween in the circumferential direction.

3. A clutch apparatus according to claim 2, wherein said clutch cover has a plurality of axially extending portions at an outer periphery thereof and an end of said axially extending portions are bent radially inward to form said engagement portions.

4. A clutch apparatus according to claim 3, wherein said engagement portions and said projections are engaged such that said axially extending portions of said clutch cover are retained between a portion of said projections and a portion of said input flywheel against radially outward movement.

5. A clutch apparatus according to claim 4, wherein an end surface of each of said projections facing said engine side is inclined with respect to the radial direction such that the radially inner portion of said projection has a smaller axial length, and said engagement portions are bent so as to fit into said projections.

6. A clutch apparatus according to claim 5, wherein f said fixing members comprises at least one plate non-rotatably fixed to said clutch cover and removable bolts which extend through said plate fixing said clutch cover to said input flywheel.

7. A clutch apparatus according to claim 6, wherein said plates are fixed to an outer radial surface of said input flywheel and said bolts extend lengthwise in the radial direction with respect to said input flywheel.

8. A clutch apparatus according to claim 7, further comprising a damper mechanism including a drive rotation member, a driven rotation member connected rigidly to said input flywheel, an elastic member disposed between said drive rotation member and said driven rotation member for circumferential compression by relative rotation between said drive rotation member and said driven rotation member; and a cylindrical inertia member fixed to an outer periphery of said drive rotation member so as to surround said damper mechanism, said input flywheel, said clutch disc assembly and said clutch cover assembly, and said inertia member is formed with holes through which said fixing members can be manipulated.

9. A clutch apparatus comprising:

a damper mechanism including a drive rotation plate, a driven rotation plate and an elastic member elastically and circumferentially coupling said drive rotation plate and said driven rotation plate;

a flywheel rigidly connected to said driven rotation plate;

a clutch cover assembly having a clutch cover fixed to an outer peripheral portion of said flywheel, a pressure plate disposed between said clutch cover and said flywheel, and a biasing member supported by said clutch cover for biasing said pressure plate toward said flywheel;

a clutch disk assembly having a frictional coupling portion disposed between said flywheel and said pressure plate;

a cylindrical inertia member extending axially to surround outer peripheries of said damper mechanism, said clutch disk assembly, said flywheel and said clutch cover assembly; and fixing members disposed at a radially outer portion of said clutch cover assembly for fixing said drive rotation plate and said cylindrical inertia member together; and wherein said flywheel is provided with a plurality of projections which are circumferentially spaced from each other and are projecting radially outwardly;

said clutch cover is formed with a plurality of engagement portions engaged with said projections; and wherein said fixing members include a plurality of bolts which are installed from an outer side of said clutch cover for fixing said input rotation plate and said cylindrical inertia member together.

10. A clutch apparatus according to claim 9, wherein said bolts are located circumferentially between said projections of said flywheel.

11. A clutch apparatus according to claim 10, wherein said cylindrical inertial member is formed with a plurality of grooves at radially inward portions thereof through which said bolts may extend.

12. A clutch apparatus to be mounted on a crankshaft of an engine, comprising:

a flexible plate connected rigidly with a crankshaft at an outer circumferential portion thereof, having a rigidity in the rotational direction of said clutch apparatus and flexible in the bending direction of said crankshaft;

a damper mechanism including a drive member connected to an outer periphery of said flexible plate, a driven member and an undulated plate spring extending in the rotational direction of said clutch apparatus and compressible between said drive member and said driven member in the rotational direction;

a flywheel rigidly connected to an inner circumferential portion of said driven member and has a friction surface;

a clutch disk assembly including a friction engagement portion adjacent to said friction surface; and a clutch cover assembly including a clutch cover having an outer periphery connected to said flywheel, a pressure plate disposed within a clutch cover and adjacent to said friction engagement portion of said clutch disk assembly and an urging member supported by said clutch cover and urging said pressure plate against said friction engagement portion.

13. A clutch apparatus according to claim 12, wherein said undulate plate spring is formed with repeated folds so as to have an accordion-style ribbon-like shape.

14. A clutch apparatus according to claim 12, wherein said undulated plate spring includes a plurality of loop sections and a plurality of lever sections, each of said lever sections extending from a corresponding end of said loop section.

15. A clutch apparatus according to claim 12, wherein said drive member is composed of two drive disc plates outer peripheries of which are fixed to each other so as to form an annular chamber, and said driven member is a driven disc disposed in said annular chamber, and said undulated plate spring is located in said annular chamber.

16. A clutch apparatus according to claim 15, wherein said annular chamber is filled with a fluid.

17. A clutch apparatus according to claim 16, wherein said damper mechanism includes a viscous resistance generating mechanism for generating a viscous resistance in accordance with relative rotation between said input rotation member and said flywheel.

18. A clutch cover apparatus according to claim 17, wherein a choke is defined between inner walls of said drive disc plate and said undulated plate spring.

19. A damper assembly mounted on a crankshaft of an engine, comprising:

a flexible plate connected rigidly with said crankshaft at an outer circumferential portion thereof, having a rigidity in the rotational direction of said clutch apparatus and flexible in the bending direction of said crankshaft;

a damper mechanism including two drive disc plates outer peripheries of which are fixed to each other so as to form an annular chamber, and a driven disc disposed in said annular chamber, and an undulated plate spring located in said annular chamber and extending in the rotational direction of said clutch apparatus and compressible between said drive member and said driven member in the rotational direction.

20. A damper assembly according to claim 19, wherein said undulated plate spring is repeatedly folded so as to make accordion-style ribbon-like shape.

21. A damper assembly according to claim 20, wherein said undulated plate spring has a plurality of loop sections and a plurality of lever sections extending from opposite ends of said loop section.

22. A damper assembly according to claim 19, wherein said annular chamber is filled with a fluid.

23. A damper assembly according to claim 22, wherein said damper mechanism includes a viscous resistance generating mechanism for generating a viscous resistance in accordance with relative rotation between said input rotation member and said flywheel.

24. A damper assembly according to claim 23, wherein a choke is defined between inner walls of said drive disc plate and said undulated plate spring.

25. A clutch cover assembly fixed to a flywheel and operable to engage and disengage a clutch, comprising:

a flywheel provided at its outer peripheral portion with a plurality of circumferentially spaced projections projecting radially outwardly and having a clutch disc engaging surface on a first axial side thereof, said projections being spaced apart from a second axial side thereof defining an axially extending space between a radial outer edge of said second axial side and said projections;

a clutch cover assembly having a clutch cover provided at its outer peripheral edge with a plurality of engagement portions which are engageable with said projections of said flywheel respectively to prevent axial relative movement toward said first axial side with respect to said flywheel, said clutch cover assembly further including fixing members fixing said flywheel and said clutch cover relatively unrotatably and being removable therefrom, a pressure plate disposed between said clutch cover and said flywheel, and a biasing member supported at an inner peripheral portion of said clutch cover for biasing said pressure plate toward said flywheel, said engagement portions being disposed in said axially extending space and said engagement portions being spaced apart from said radial outer edge of said second axial side of said flywheel;

a clutch disk assembly having a frictional coupling portion disposed between said flywheel and said pressure plate, said friction coupling portion engaging said clutch disc engaging surface;

a pressure plate disposed between said clutch cover and said flywheel;

a first biasing member in a circular plate form carried by said clutch cover for biasing said pressure plate toward said flywheel; and a plate member unrotatably coupling an inner peripheral portion of said clutch cover to an inner peripheral portion of said pressure plate;

wherein said plate member is formed of an annular portion fixed to said clutch cover and a plurality of coupling portions formed integrally with said annular portion, extending in a circumferential direction and fixed to said pressure plate.

26. A clutch cover assembly according to claim 25, further comprising a supporting mechanism disposed at the inner peripheral portion of said clutch cover connected to said plate member and supporting a radially middle portion of said first biasing member.

27. A clutch cover assembly according to claim 26, wherein said supporting mechanism has a plurality of fixing portions extending from said clutch cover through said first biasing member and fixed to said plate member, and two wire rings disposed between said clutch cover and said first biasing member and between said plate member and said first biasing member, respectively.

28. A clutch cover assembly according to claim 27, further comprising:

a second biasing member supported by said plate member, for biasing the outer peripheral portion of said first biasing member away from said pressure plate when said clutch is released.

29. A clutch cover assembly according to claim 26, wherein said supporting mechanism has a plurality of fixing portions extending from said clutch cover through said first biasing member and fixed to said plate member; and said clutch cover and said plate member are provided with annular projections supporting said first biasing member located therebetween.

30. A clutch cover assembly according to claim 29, further comprising:

a second biasing member supported by said plate member, for biasing the outer peripheral portion of said first biasing member away from said pressure plate when said clutch is released.

31. A clutch cover assembly fixed to a flywheel and operable to engage and disengage a clutch, comprising:

a flywheel provided at its outer peripheral portion with a plurality of circumferentially spaced projections projecting radially outwardly and having a clutch disc engaging surface on a first axial side thereof, said projections being spaced apart from a second axial side thereof defining an axially extending space between a radial outer edge of said second axial side and said projections;

a clutch cover assembly having a clutch cover provided at its outer peripheral edge with a plurality of engagement portions which are engageable with said projections of said flywheel respectively to prevent axial relative movement toward said first axial side with respect to aid flywheel said clutch cover assembly further including fixing members fixing said flywheel and said clutch cover relatively unrotatably and being removable therefrom, a pressure plate disposed between said clutch cover and said flywheel, and a biasing member supported at an inner peripheral portion of said clutch cover for biasing said pressure plate toward said flywheel, said engagement potions being disposed in said axially extending space and said engagement portions being spaced apart from said radial outer edge of said second axial side of said flywheel;

a clutch disk assembly having a frictional coupling portion disposed between said flywheel and said pressure plate, said friction coupling portion engaging said clutch disc engaging surface;

a pressure plate disposed between said clutch cover and said flywheel;

a first biasing member in a circular plate form carried by said clutch cover for biasing said pressure plate toward said flywheel;

a plate member unrotatably coupling an inner peripheral portion of said clutch cover to an inner peripheral portion of said pressure plate, said plate member is formed of a plurality of plate members, fixed at one of its ends to said clutch cover, and fixed at the other end to an inner peripheral portion of said pressure plate; and a supporting mechanism disposed at the inner peripheral portion of said clutch cover connected to said plate member and supporting a radially middle portion of said first biasing member.

32. A clutch cover assembly according to claim 31, wherein said supporting mechanism has a plurality of fixing portions extending from said clutch cover through said first biasing member, an annular plate fixed to said fixing portions and said plate member, and two wire rings disposed between said clutch cover and said first biasing member and between said first biasing member and said annular plate, respectively.

33. A clutch cover assembly according to claim 32, further comprising:

a second biasing member supported by said annular plate, and biasing the outer peripheral portion of said first biasing member away from said pressure plate when said clutch is released.

34. A clutch cover assembly according to claim 31, wherein said supporting mechanism has a plurality of fixing portions extending from said clutch cover through said first biasing member and fixed to said plate member, and an annular supporting plate fixed to said fixing portion and fixed to one of ends of said plate member; and said clutch cover and said annular supporting plate are provided with annular projections supporting said first biasing member located therebetween.

35. A clutch cover assembly according to claim 34, further comprising:
a second biasing member supported by said annular supporting plate, for biasing the outer peripheral portion of said first biasing member away from said pressure plate when said clutch is released.

* * * * *

UNITED STATES PATENT AND TRADEMARK OFFICE
CERTIFICATE OF CORRECTION

PATENT NO. : 5,868,232
DATED : Feb. 9, 1999
INVENTOR(S) : Hirotaka FUKUSHIMA

It is certified that error appears in the above-identified patent and that said Letters Patent is hereby corrected as shown below:

On the Title page, item [54], and Col 1, line 2

In the title of the invention, please rewrite "DAMPENSING" as --DAMPENING--.

Signed and Sealed this

Tenth Day of August, 1999

Attest:

Q. TODD DICKINSON

*Attesting Officer*   *Acting Commissioner of Patents and Trademarks*